US012621192B2

(12) United States Patent
Schlegel et al.

(10) Patent No.: US 12,621,192 B2
(45) Date of Patent: May 5, 2026

(54) SOFT-DEMODULATION BASED WAVEFORM REPAIR FOR SIGNALS UNDERGOING SPECTRAL SUPPRESSION

(71) Applicant: L3Harris Technologies, Inc., Melbourne, FL (US)

(72) Inventors: Christian Schlegel, Park City, UT (US); L. Andrew Gibson, Jr., Riverton, UT (US); Evan D. Poff, Draper, UT (US); Edwin R. Twitchell, Fruit Heights, UT (US); David R. Keller, Herriman, UT (US); Lance Lindsay, Woods Cross, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 79 days.

(21) Appl. No.: 18/742,497

(22) Filed: Jun. 13, 2024

(65) Prior Publication Data

US 2025/0385816 A1 Dec. 18, 2025

(51) Int. Cl.
H04L 25/03 (2006.01)

(52) U.S. Cl.
CPC .. H04L 25/03305 (2013.01); H04L 25/03171 (2013.01)

(58) Field of Classification Search
CPC .................... H04L 25/03305; H04L 25/03171
USPC ........................................................ 375/340
See application file for complete search history.

(56) References Cited

U.S. PATENT DOCUMENTS

| | | | |
|---|---|---|---|
| 7,567,635 B2 | 7/2009 | Scheim et al. | |
| 7,593,492 B1 * | 9/2009 | Lande .................. | H04B 1/7103 |
| | | | 375/148 |
| 8,433,015 B2 | 4/2013 | Downey et al. | |
| 8,929,492 B2 | 1/2015 | Downey et al. | |
| 9,197,360 B2 | 11/2015 | Wyckoff | |
| 9,391,654 B2 | 7/2016 | Wyckoff et al. | |
| 9,537,521 B2 | 1/2017 | Downey et al. | |
| 9,537,689 B2 | 1/2017 | Zhou et al. | |
| 2007/0033476 A1 | 2/2007 | Osnato et al. | |
| 2009/0322950 A1 * | 12/2009 | Mitsunaka ............... | H04B 1/28 |
| | | | 348/731 |
| 2014/0056345 A1 * | 2/2014 | Dickson ............ | H04L 25/03057 |
| | | | 375/233 |
| 2018/0262380 A1 * | 9/2018 | Yeste Ojeda ......... | H04L 25/062 |

(Continued)

FOREIGN PATENT DOCUMENTS

| | | | | |
|---|---|---|---|---|
| CN | 106209714 | 12/2016 | | |
| WO | WO-2024012164 A1 * | 1/2024 | ........... | H04L 25/023 |

OTHER PUBLICATIONS

Perotti et al., "Simultaneous Wireless Information and Power Transfer by Continuous-Phase Modulation," IEEE Communications Letters, IEEE Service Center, Piscataway, NJ, US, vol. 24, No. 6, pp. 1294-1298 (2020).

(Continued)

*Primary Examiner* — Leila Malek

(74) *Attorney, Agent, or Firm* — Fox Rothschild LLP; Carol E. Thorstad-Forsyth

(57) ABSTRACT

Systems and methods for waveform repair. The methods comprise: receiving a signal of interest having a spectral distortion, the signal of interest having a sequence of symbols; generating an estimate for each symbol of a sequence of symbols in the signal of interest; and applying reconstruction filtering to the estimates to correct the spectral distortion.

15 Claims, 12 Drawing Sheets

(56)  References Cited

U.S. PATENT DOCUMENTS

| | | | |
|---|---|---|---|
| 2020/0052675 A1* | 2/2020 | Kanazawa | H03H 9/14552 |
| 2023/0283282 A1* | 9/2023 | vor dem Brocke | H03L 7/104 |
| | | | 327/156 |
| 2025/0119323 A1* | 4/2025 | Xu | H04L 25/023 |

OTHER PUBLICATIONS

Sugiyama et al., "An Integrated Interference Suppression Scheme with an H04I Adaptive Equalizer for Digital Satellite Communication System," IEICE Transaction on Communication, Communications Society, Tokyo, JP, vol. E79-B, No. 2, pp. 191-197 (1996).

* cited by examiner

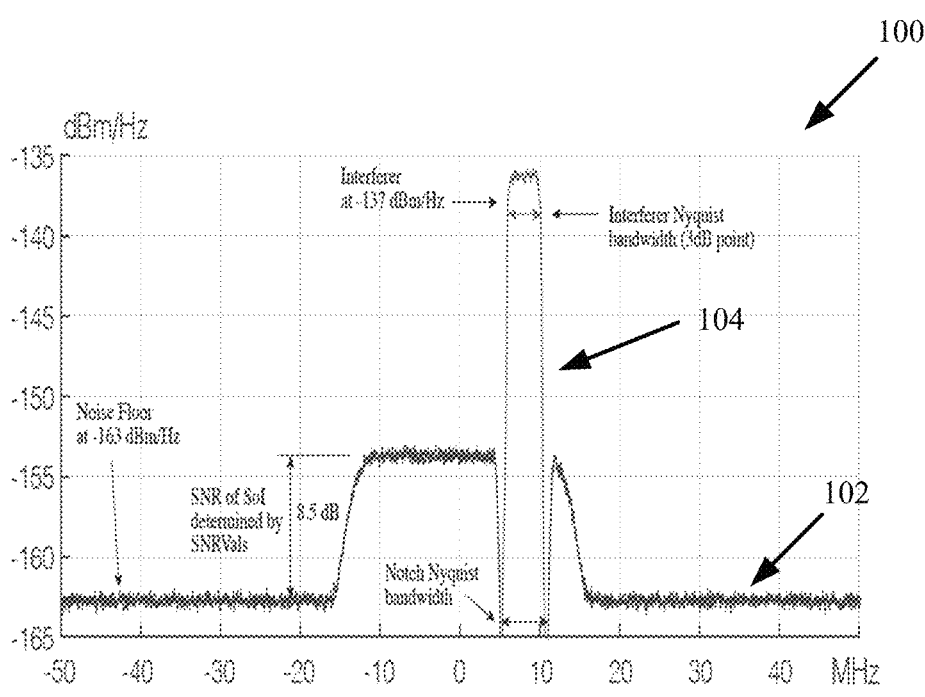
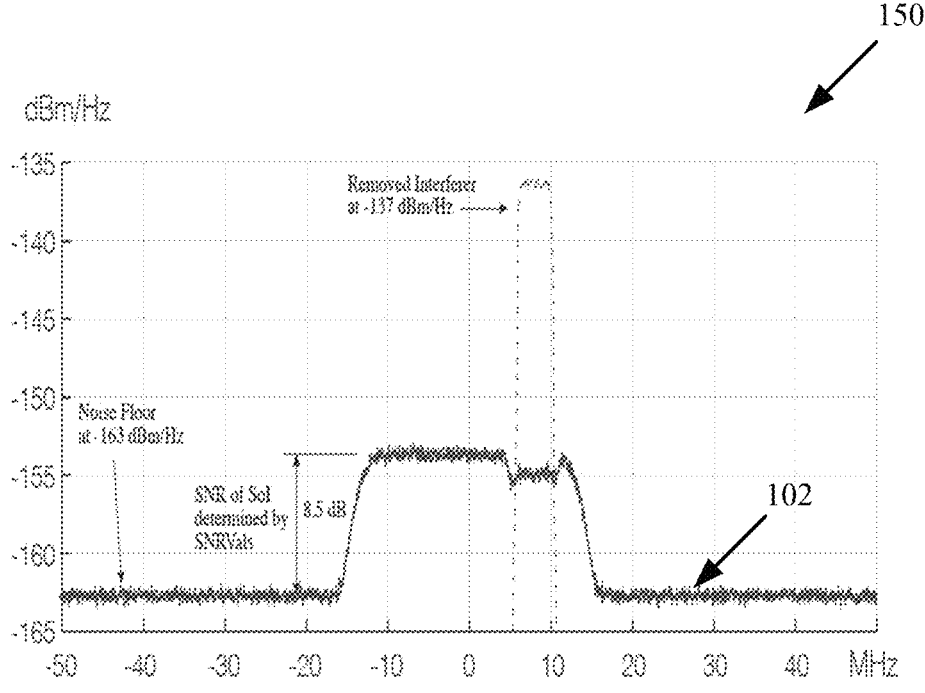
FIG. 1

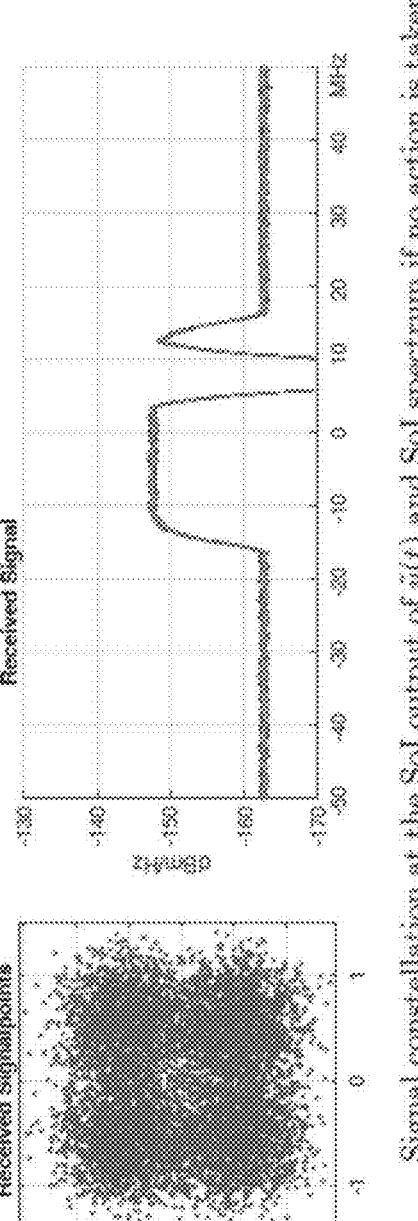
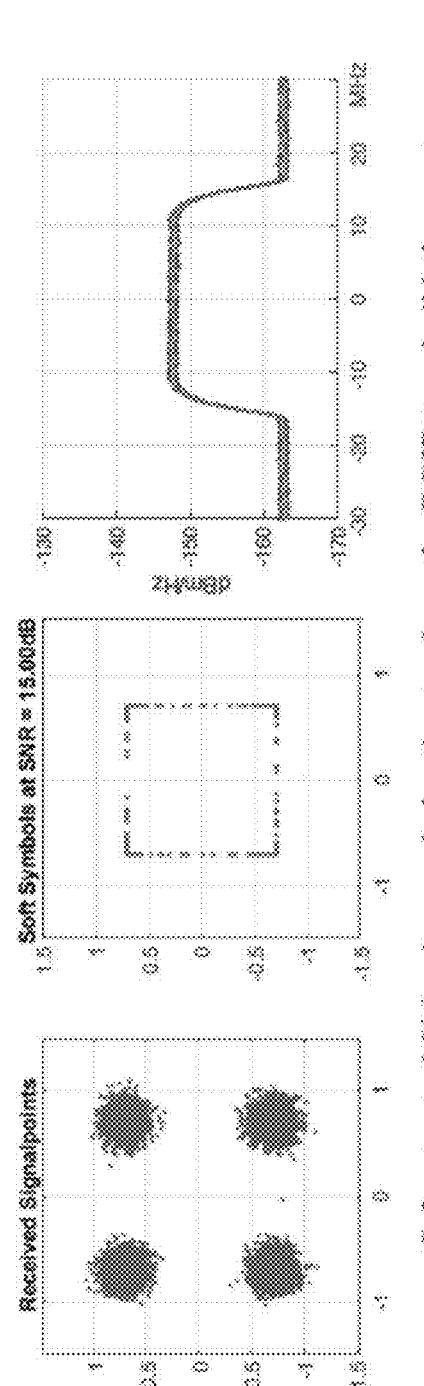
FIG. 8

1100

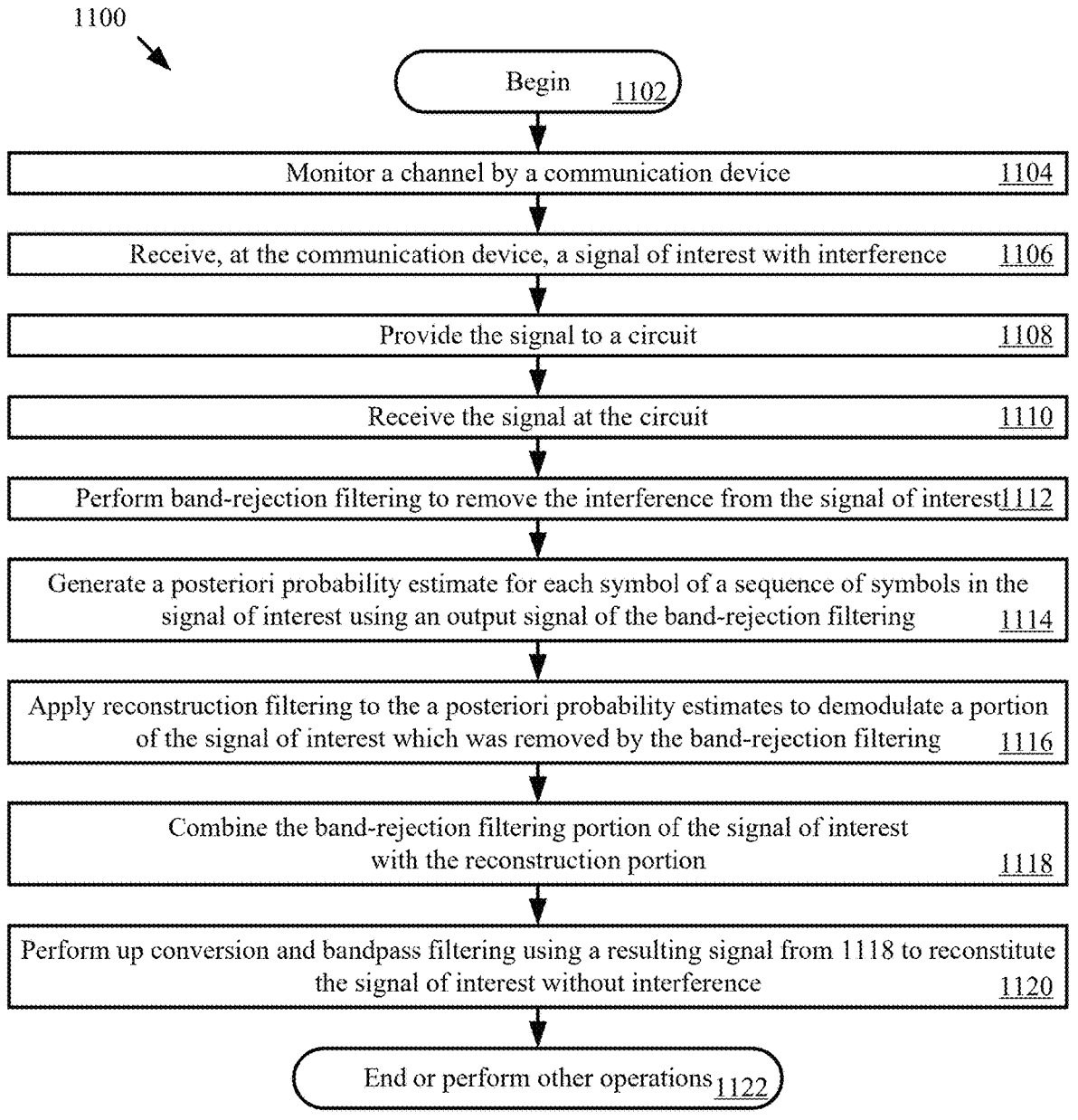

Begin    1102

Monitor a channel by a communication device    1104

Receive, at the communication device, a signal of interest with interference    1106

Provide the signal to a circuit    1108

Receive the signal at the circuit    1110

Perform band-rejection filtering to remove the interference from the signal of interest 1112

Generate a posteriori probability estimate for each symbol of a sequence of symbols in the signal of interest using an output signal of the band-rejection filtering    1114

Apply reconstruction filtering to the a posteriori probability estimates to demodulate a portion of the signal of interest which was removed by the band-rejection filtering    1116

Combine the band-rejection filtering portion of the signal of interest with the reconstruction portion    1118

Perform up conversion and bandpass filtering using a resulting signal from 1118 to reconstitute the signal of interest without interference    1120

End or perform other operations 1122

FIG. 11

SOFT-DEMODULATION BASED WAVEFORM REPAIR FOR SIGNALS UNDERGOING SPECTRAL SUPPRESSION

BACKGROUND

Description of the Related Art

A communication signal can be negatively impacted by interference. A solution to mitigate and overcome this type of interference exist with notching the signal with products such as a frequency notching filter (FNF). For wide-band interference signals, however, current methods for such notching may remove too much of a communications signal itself and render it undecodable.

SUMMARY

The present disclosure concerns implementing systems and methods for waveform repair. The methods comprise: receiving a signal of interest having a spectral distortion, the signal of interest having a sequence of symbols; generating an estimate for each symbol of a sequence of symbols in the signal of interest; and applying reconstruction filtering to the estimates to correct the spectral distortion.

The present disclosure also concerns a circuit, comprising: an approximate soft symbol demodulator configured to generate an estimate for each symbol of a sequence of symbols in a received signal of interest having a spectral distortion; and a reconstruction filter configured to apply reconstruction filtering to the estimates to correct the spectral distortion.

The present disclosure further concerns a non-transitory computer-readable medium that stores instructions that, when executed by at least one computing device, will cause the at least one computing device to perform operations comprising: receiving a signal of interest having a spectral distortion, the signal of interest having a sequence of symbols; generating an estimate for each symbol of a sequence of symbols in the signal of interest; and applying reconstruction filtering to the estimates to correct the spectral distortion.

BRIEF DESCRIPTION OF THE DRAWINGS

The present solution will be described with reference to the following drawing figures, in which like numerals represent like items throughout the figures.

FIG. 1 provides graphs that are useful for understanding notch filtering and signal reconstruction.

FIG. 8 provides a first graph showing signal constellation at the SOI output and SOI spectrum if no action is taken, along with a second graph showing the SOI output using symbol estimates from a BCJR algorithm to rebuild the SOI spectrum.

FIG. 11 provide a flow diagram of an illustrative method for processing a received signal.

DETAILED DESCRIPTION

As noted above, a communication signal can be negatively impacted by interference. A solution to mitigate and overcome this type of interference exists with notching the signal with products such as an frequency notching filter (FNF) module. For wider interference signals, current methods that notch the signal remove too much of the communication signal to then be demodulated error free. The effectiveness of notching can be substantially mitigated by deriving soft symbols of the signal of interest via a soft symbol estimator, such as a decoder implementing the Bahl, Cocke, Jelinek, and Raviv (BCJR) algorithm to optimally estimate symbols in signals distorted by such notch filtering. After interference (e.g., signal 104 in graph 100 of FIG. 1) is removed, the SOI (e.g., signal 102 in graph 100 of FIG. 1) has too much spectral signal content removed by the notch filtering for the signal to be received error-free. The BCJR decoder provides a means to obtain high-accuracy estimated probabilities for each symbol of the SOI despite signal degradation due to the notched-out portion thereof and allows for the rebuilding of the spectral component that were removed by notch filtering. Consequently, the SOI may be received error free (e.g., as shown in graph 150 of FIG. 1) without further special equipment.

Figure 2:
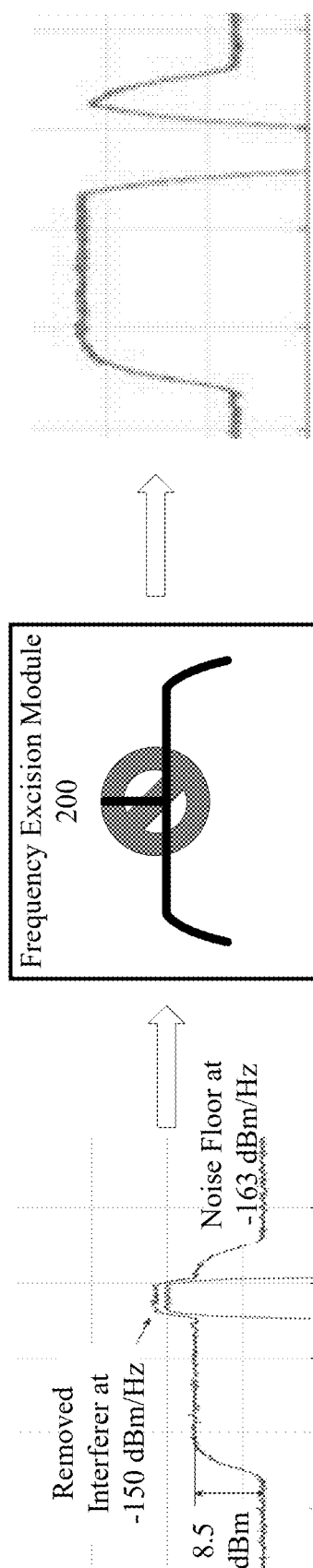
FIG. 2 provides an illustration that is useful for understanding notch filtering.

An FNF module 200 of FIG. 2 is configured to remove interference from a signal via notching a portion of the signal that contains interference at higher power than the SOI. The FNF module 200 performs operations to notch interference out of the spectrum. If the notch is small enough, the demodulator can lock onto the SOI and the forward error correction (FEC) typically present in the signal of interest may correct any errors in the data resulting from the notching of the signal.

The present solution concerns systems and methods for soft-demodulation-based waveform repair for signals undergoing spectral suppression that would exceed the correction capability of an FEC system. The present solution may be used in various applications. The applications can include, but are not limited to, any multipath signal propagation situation that may arise from the transmission of radio or acoustic signals, atmospheric condition applications that would depress significant portions of the signal spectrum, signal interference cancellation applications as discussed above, and/or intentional or unintentional removal of parts of the spectrum of the signal of interest.

The methods of the present solution generally involve: receiving a signal comprising a signal of interest with interference; performing band-rejection filtering to remove the interference from the signal of interest; generating a a posteriori probability estimate for each symbol of a sequence of symbols in the signal of interest using an output signal of the band-rejection filtering; applying reconstruction filtering to the a posteriori probability estimates to demodulate a portion of the signal of interest which was removed by the band-rejection filtering; combining the band-rejection filtered portion of the signal of interest with the reconstructed portion; and performing upconversion and bandpass filtering using a resulting signal from said combining to reconstitute the signal of interest without interference.

Figure 3:
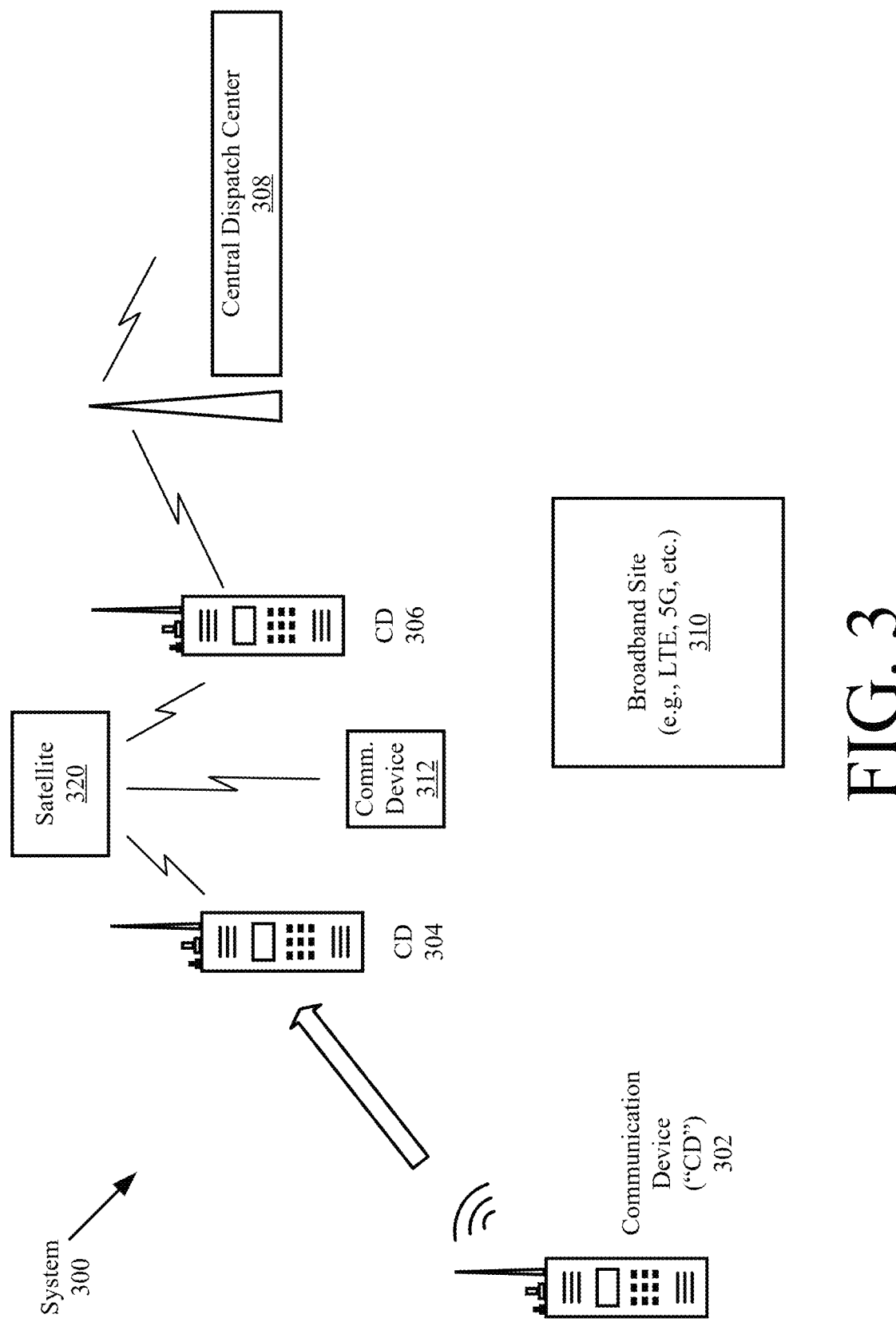
FIG. 3 provides an illustration of a system implementing the present solution.

FIG. 3 shows an illustrative system 300 implementing the present solution. System 300 comprises a plurality of communication devices 302, 304, 306, a central dispatch center (CDC) 308, a broadband site 310, and satellite 320. The communication devices 302-306 include, but are not limited to, a portable radio, a fixed radio with a static location, a smart phone, a ground station, and/or a base station. The broadband site 310 includes, but is not limited to, an LMR site, a 2G cellular site, a 3G cellular site, a 4G cellular site, and/or a 5G cellular site. CDC 308 and broadband site 310 are well known in the art, and therefore will not be described herein.

During operation of system 300, the signals at the satellite 320 need processing in accordance with the present solution since interference is occurring in that location in the system. One scenario is when communication devices all point to the sky, possibly to different satellites 320, but unwanted signals impinge on the satellite 320. Another scenario is when interference may be caused by other sources such as the broadband site 310.

As shown in FIG. 3, signals are communicated between the communication devices 302-306, between one or more communication devices 304, 306, 312 and the satellite 320, and/or between one or more communication devices 306 and the CDC 308. For example, communication device 302 communicates a signal to communication device 304, communication devices 304-306 communicate signals to satellite 320, and CDC 308 communicates a signal to communication device 306. Communication devices 304 and 306 perform operations to mitigate interference caused by the broadband site 310 on a given RF communication channel and/or other communication device 312 on a satellite communication channel. The manner in which communication devices 304 and 306 mitigate the interference to signals will become evident as the discussion progresses.

Figure 4:
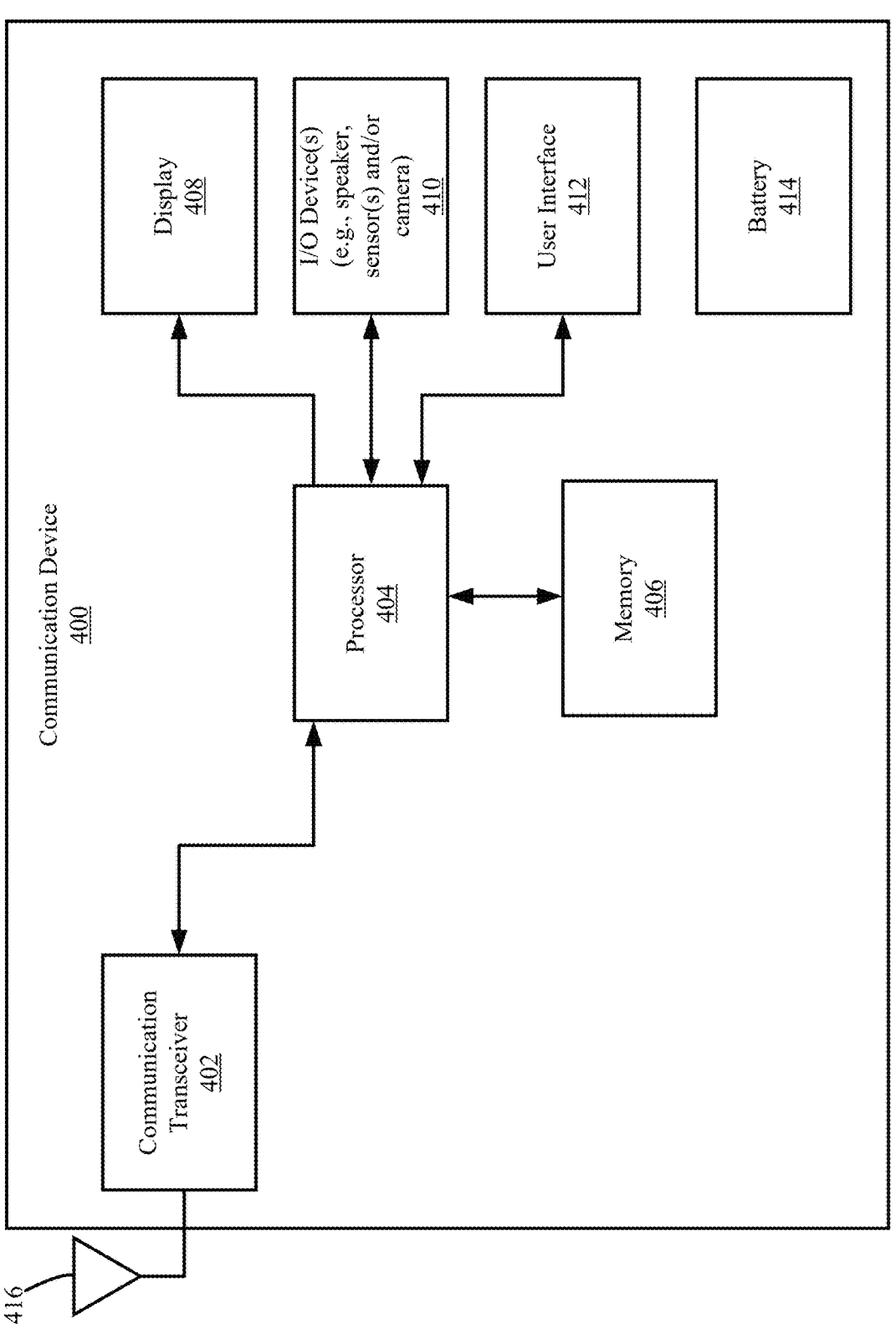
FIG. 4 provides a block diagram of a communication device.

Referring now to FIG. 4, there is provided an illustration of an example architecture for a communication device 400 that is configured for carrying out the various methods described herein for mitigating the signal interference. Communication devices 302-306 of FIG. 3 are the same as or similar to communication device 400. As such, the discussion provided below in relation to communication device 400 is sufficient for understanding communication devices 302-306 of FIG. 3. Communication device 400 can include more or fewer components than that shown in FIG. 4 in accordance with a given application. For example, communication device 400 can include one or both components 408 and 410. The present solution is not limited in this regard.

As shown in FIG. 4, the communication device 400 comprises a communication transceiver 402 coupled to an antenna 416. The communication transceiver can comprise one or more components such as a processor, an application-specific circuit, a programmable logic device, a digital signal processor, or other circuit programmed to perform the functions described herein. The communication transceiver 402 can enable end-to-end communication services in a manner known in the art. In this regard, the communication transceiver can facilitate communication of data (e.g., voice data and/or media content) from the communication device 400 over a network and/or communications channel (e.g., a satellite communication channel).

The communication transceiver 402 can include, but is not limited to, a radio transceiver, a satellite transceiver, and/or a cellular network communication transceiver. The communication transceiver 402 is connected to a processor 404 comprising an electronic circuit. During operation, the processor 404 is configured to control the communication transceiver 302 for providing communication services. The processor 404 also facilitates mitigation of interference to signals. The manner in which the processor facilitates interference mitigation will become evident as the discussion progresses.

A memory 406, display 408, user interface 412, and input/output (I/O) device(s) 410 are also connected to the processor 404. The processor 404 may be configured to collect and store data generated by the I/O device(s) 410 and/or external devices (not shown). The I/O device(s) 410 can include, but is (are) not limited to, a speaker, a microphone, sensor(s) (e.g., a temperature sensor and/or a humidity sensor), and/or a camera. Data stored in memory 406 can include, but is not limited to, one or more look-up tables or databases which facilitate selection of communication groups or a specific communication device. The user interface 412 includes, but is not limited to, a plurality of user depressible buttons that may be used, for example, for entering numerical inputs and selecting various functions of the communication device 400. This portion of the user interface may be configured as a keypad. Additional control buttons and/or rotatable knobs may also be provided with the user interface 412. A battery 414 or other power source may be provided for powering the components of the communication device 400. The battery 400 may comprise a rechargeable and/or replaceable battery. Batteries are well known in the art and therefore will not be discussed here.

The communication device architecture shown in FIG. 4 should be understood to be one possible example of a communication device system which can be used in connection with the various implementations disclosed herein. However, the systems and methods disclosed herein are not limited in this regard, and any other suitable communication device system architecture can also be used without limitation. Applications that can include the apparatus and systems broadly include a variety of electronic and computer systems. In some scenarios, certain functions can be implemented in two or more specific interconnected hardware modules, or in devices with related control and data signals communicated between and through the modules, or in portions of an application-specific integrated circuit. Thus, the illustrative system is applicable to software, firmware, and hardware implementations.

Figure 5:
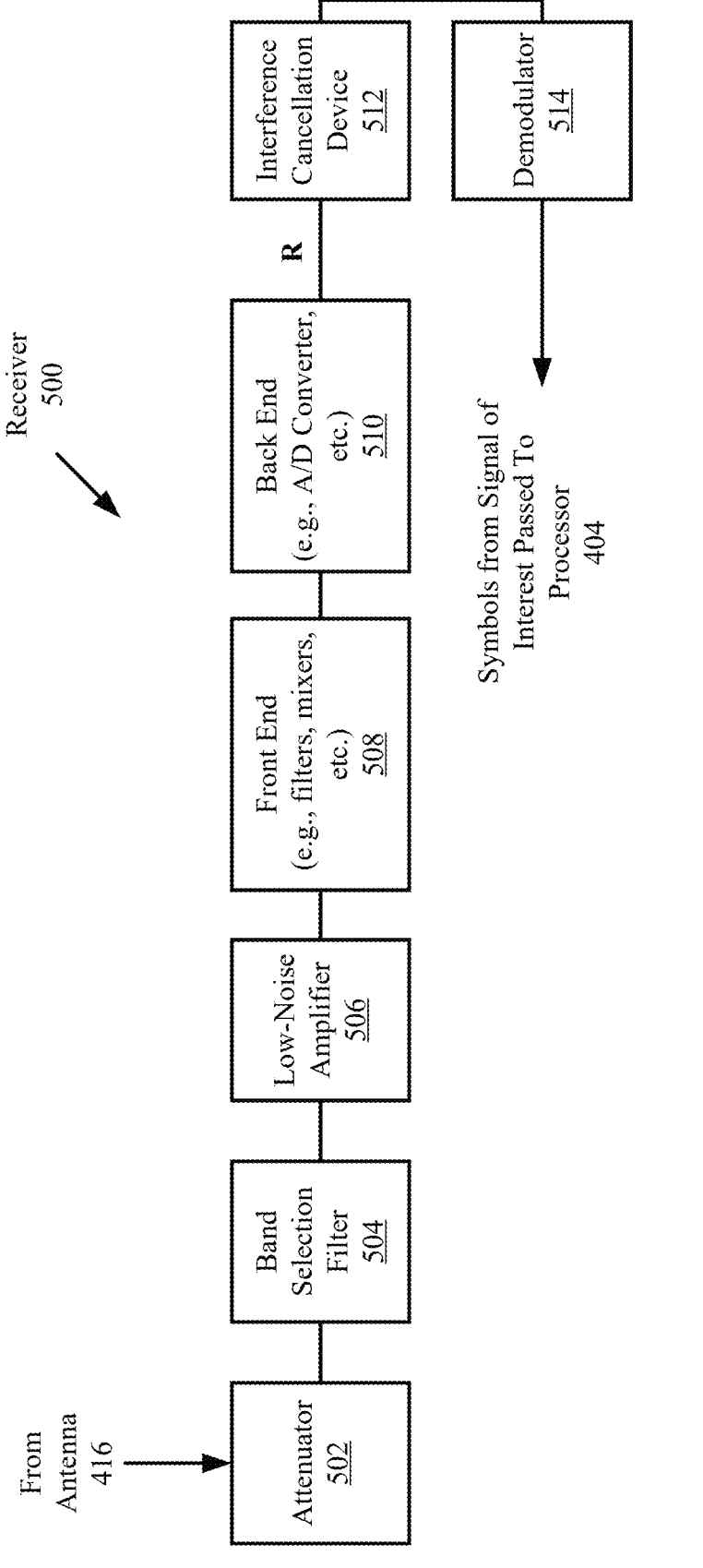
FIG. 5 provides a block diagram of a receiver.

FIG. 5 provides a more detailed illustration of an illustrative receiver portion 500 of the communication transceiver 402. Receiver 500 comprises an attenuator 502, a band selection filter 504, a low-noise amplifier (LNA) 506, front-end hardware 508, back-end hardware 510, an interference cancellation device 512 and a downstream demodulator 514. Each of the listed devices 502-510 and 514 is known in the art. The interference cancellation device 512 and/or demodulator hardware 514 implement(s) the present solution and is (are) generally configured to remove interfering signals from received signals. The resulting signal is then demodulated so that, for example, symbols can be extracted therefrom. The manner in which the signal interference is removed from received signals will become evident as the discussion progresses.

Figure 6:
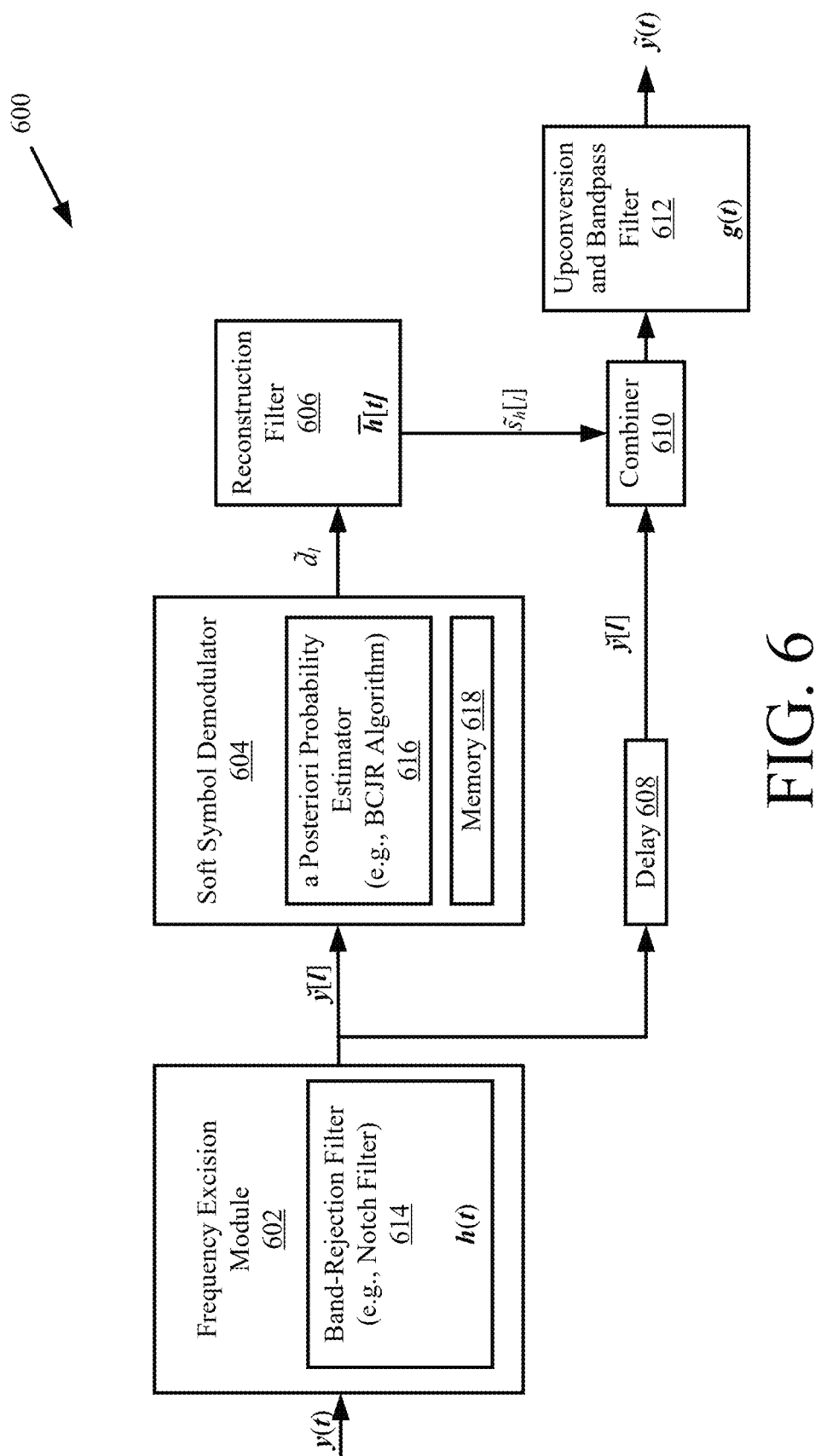
FIG. 6 provides a block diagram of a signal processing circuit implementing the present solution.

FIG. 6 provides an illustrative architecture for a circuit implementing the present solution. Circuit 600 may be implemented in the interference cancellation device 512 of FIG. 5 and/or the demodulator hardware 514 of FIG. 5. Circuit 600 comprises an FNF module 602 and a soft symbol demodulator 604 using exact or approximate a posteriori symbol estimates of the signal of interest. The FNF module 602 is configured to remove interference signal components from a received signal y(t). The FNF module 602 can include, but is not limited to, a band-rejection filter 614 and a pulse matched filter (not shown). The band-rejection filter can include, for example, a digital notch filter, an analog notch filter, or any other filter that causes signal degradation through removal of contaminated frequency signal components. Notch filters and pulse match filters are well known. The notch filter is configured to notch out the problematic frequency band with a (weighted) notch filter, leaving the filtered sampled signal ў[l]. In this regard, the notch filter comprises a band-rejection filter that attenuates the interference signal components and passes all other signal components with negligible attenuation.

The notching operation of the FNF module 602 causes inter-symbol interference (ISI) in the filtered sampled signal ў[l]. The filtered sampled signal ў[l] is passed to the approximate soft symbol demodulator 604 as well as a delay 608.

This filter may be implemented as an inverted raised-cosine (RC) filter with spectral response RC(f, $B_N$, $f_c$ β), where $B_N$ is the bandwidth of the RC filter, $f_c$ is its center frequency, and β is the roll-off factor. The frequency function of RC(f, $B_N$, $f_c$ β) can be found in any textbook on communications (or Wikipedia). The frequency response of the notch filter may now be expressed as N(f)=1−RC(f, $B_N$, $f_c$ β). It is clear that other filter implementations may be substituted for N(f). In fact, this filter may be thus designed to concentrate a maximum amount of energy in the center taps $704_1$-$704_5$ in FIG. 7.

The soft symbol demodulator 604 comprises an a posteriori probability estimator, or approximate probability estimator, that is configured to demodulate ў[k] in the presence of the ISI present in the filtered sampled signal ў[l]. The soft symbol demodulator can include, for example, a BCJR algorithm or other soft symbol decoding algorithm. The manner in which the soft symbols are estimated will be discussed below. The outputs of the soft symbol demodulator 604 may be defined by the following mathematical equations (1) and (2).

$$\tilde{d}_I = \sum_{k=-\infty}^{\infty} d_{I+k} h[k] \tag{1}$$

$$h[k] = \int_{-\infty}^{\infty} H(f) e^{j2\pi fk T_s} df \tag{2}$$

where j is the square root of −1; f represents the generic frequency; k represents a symbol delay, also called a channel tap; Ts represents the symbol time; and (f) may equal N(f)=1−RC(f, $B_N$, $f_c$ β) as discussed above.

The soft symbol outputs are used in a (digital) reconstruction filter 606 to fill in the missing signal portion which was removed by the band-rejection filter 614. The soft symbol decoding process is a non-linear operation. The reconstruction filter 606 can include, but is not limited to, a bandpass filter of bandwidth $B_N$. Operations of the reconstruction filter 606 may be defined by the complement of h (t) specifically, but without limitation, by RC(f, $B_N$, $f_c$ β) as discussed above.

Figure 7:
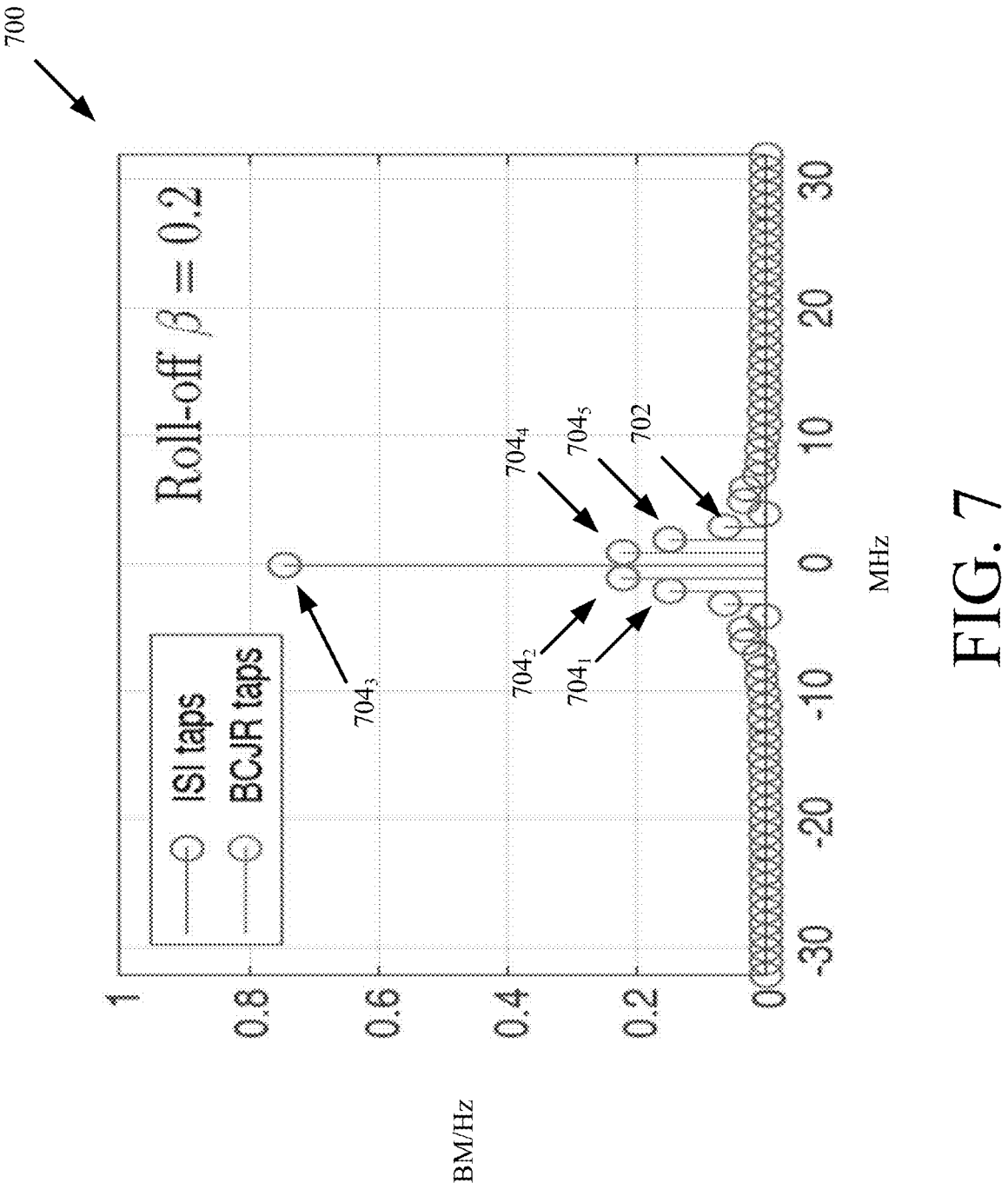
FIG. 7 provides a graph showing absolute values of taps for a rolloff value $\beta$ of 0.2.

Furthermore, the notch filter may be optimized such that the total energy contained in the center taps $704_1$, $704_2$, $704_3$, $704_4$, $704_5$ of FIG. 7 is maximized and the out-of-tap energy is minimized.

The output $\check{s}_h[l]$ of the reconstruction filter 606 represents the portion of the signal which was notched by the notch filter but excludes the noise and interference in that band, which is why the signal has less power than in the untreated frequencies (as shown in graph 150 of FIG. 1). This reconstructed portion of the signal is combined with the filtered sampled signal ў[l] by combiner 610 and passed to an upconverter and bandpass filter 612. Filter 612 rebuilds the signal ỹ(t), which is a close approximation of the signal of interest with the interference removed.

The SOI may be referred to as s(t). š(t) refers to the signal that results from filtering the SOI s(t) with the notch filter $$614\,h(t) \xrightarrow{\mathcal{F}} H(f).$$

So, s(t) may be defined by the following mathematical equation (3).

$$s(t) = \check{s}(t) + \check{s}_h(t) \tag{3}$$

where $s_h(t)$ is a signal that results from passing s(t) through the reconstruction filter 606 (i.e., a filter configured to fill in the missing part of the signal). Filter 612 is then used to rebuild the intermediate frequency (IF) or radio frequency (RF) signal ỹ(t) to achieve near complete transparency for the SOI s(t) while removing the interference in question.

Figure 10:
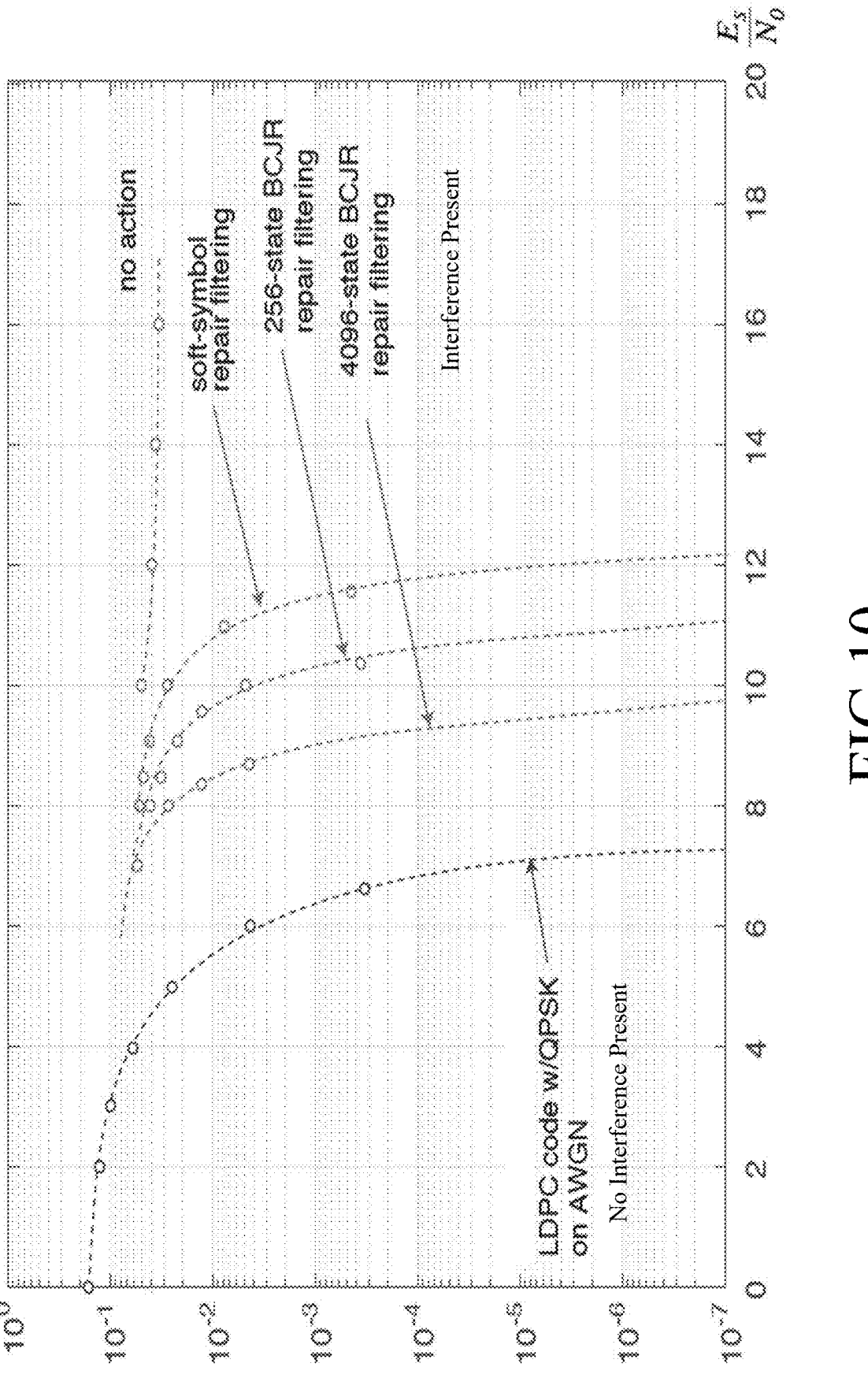
FIG. 10 provides a graph showing that soft-demodulation-based waveform repair, such as implemented with a BCJR-based repair filter, improves the bit error performance in the presence of interference.

Graph 150 of FIG. 1 shows the rebuilt signal using soft symbols generated by approximate soft symbol demodulator 604 employing a BCJR algorithm with 256 states. The present solution is not limited in this regard. The BCJR algorithm can have any number of states selected in accordance with a given application. For example, in other scenarios, the BCJR implementation could have 4096 states rather than 256 states. As shown in FIG. 10, at a signal-to-noise ratio (SNR) of 8.5 dB, the original SOI bit error rate (BER) performance is $1.8 \times 10^{-2}$ for the example simulation.

The concatenation of pulse shaping, notch filtering and pulse match filtering followed by sampling at $T_k$ leads to a discrete-tapped delay line modeling the inter-symbol interference caused by the notch filtering. The absolute values for these taps are shown in FIG. 7 for a rolloff value β of 0.2. These channel taps, or BCJR taps, $704_1$, $704_2$, $704_3$, $704_4$, $704_5$ of FIG. 7 are accounted for in the 256-state BCJR algorithm. Although five BCJR taps are shown in FIG. 7, the present solution is not limited in this regard. Any number of BCJR taps can be selected in accordance with a given application, filter behavior, or computational resources available. FIG. 8 shows a signal 800 representing an illustrative example of the spectrum of output ỹ(t) and the demodulated symbols if the operations of blocks 604-612 are not performed, as well as a signal 850 representing the same when the operations of blocks 604-612 are performed.

The BCJR algorithm is configured to compute an exact posterior symbol probability p(si|y). si represents a transmitted complex symbol, and y represents the entire sequence of received sampled complex signals. The transmitted complex symbols are described herein in relation to quadrature phase shift keying (QPSK). The present solution is not limited in this regard, and other types of modulation can be used. The other types of modulation can include, but are not limited to, binary phase-shift keying (BPSK) and/or offset QPSK (O-QPSK). From these probabilities, a soft symbol may be obtained that is defined by the following mathematical equation (4).

$$\tilde{s}_i = \sum_{symbols\ j} p(s_j|y), \forall\ i \tag{4}$$

The soft symbol $\tilde{s}_i$ may be used in conjunction with the complementary reconstruction filter 606 to reconstruct the missing signal portions removed by the band-rejection filter 614.

The BCJR algorithm is configured for a posteriori decoding of error correcting codes defined on trellises, or probability demodulation of partial-response signals, or the equalization of inter-symbol interference channels. In all of these applications, the BCJR algorithm performs a bi-directional trellis search, which traverses a system trellis in both a forward pass and a backward pass. Based on the trellis, the BCJR algorithm computes forward probabilities α and backward probabilities ß. Other derived probabilities may also be computed such as a received signal probabilities. Together with the signal probabilities, the two processing sweeps generate the required posterior symbol probabilities. The trellis that is traversed by the BCJR algorithm may be configured to track a memory of an ISI channel.

In the given scenario, the soft symbol demodulator 604 tracks BCJR taps 704₁, 704₂, 704₃, 704₄, 704₅ (collectively referred to as "704") shown in FIG. 7. ISI taps 702 are also shown in FIG. 7. The BCJR taps 704 determine the memory size for a given scenario which is sufficient for the BCJR algorithm to address the ISI. In this scenario, the system tracks five BCJR taps 704 which requires the system to maintain four past symbols $x_{i-1}$, $x_{i-2}$, $x_{i-3}$, $x_{i-4}$. This requires the past four symbols $x_{i-1}$, $x_{i-2}$, $x_{i-3}$, $x_{i-4}$ to be stored in memory 618.

For QPSK with four symbols, this means that the trellis depth, the number of states, is $4^4$-256 states in every stage of the trellis graph.

Figure 9:
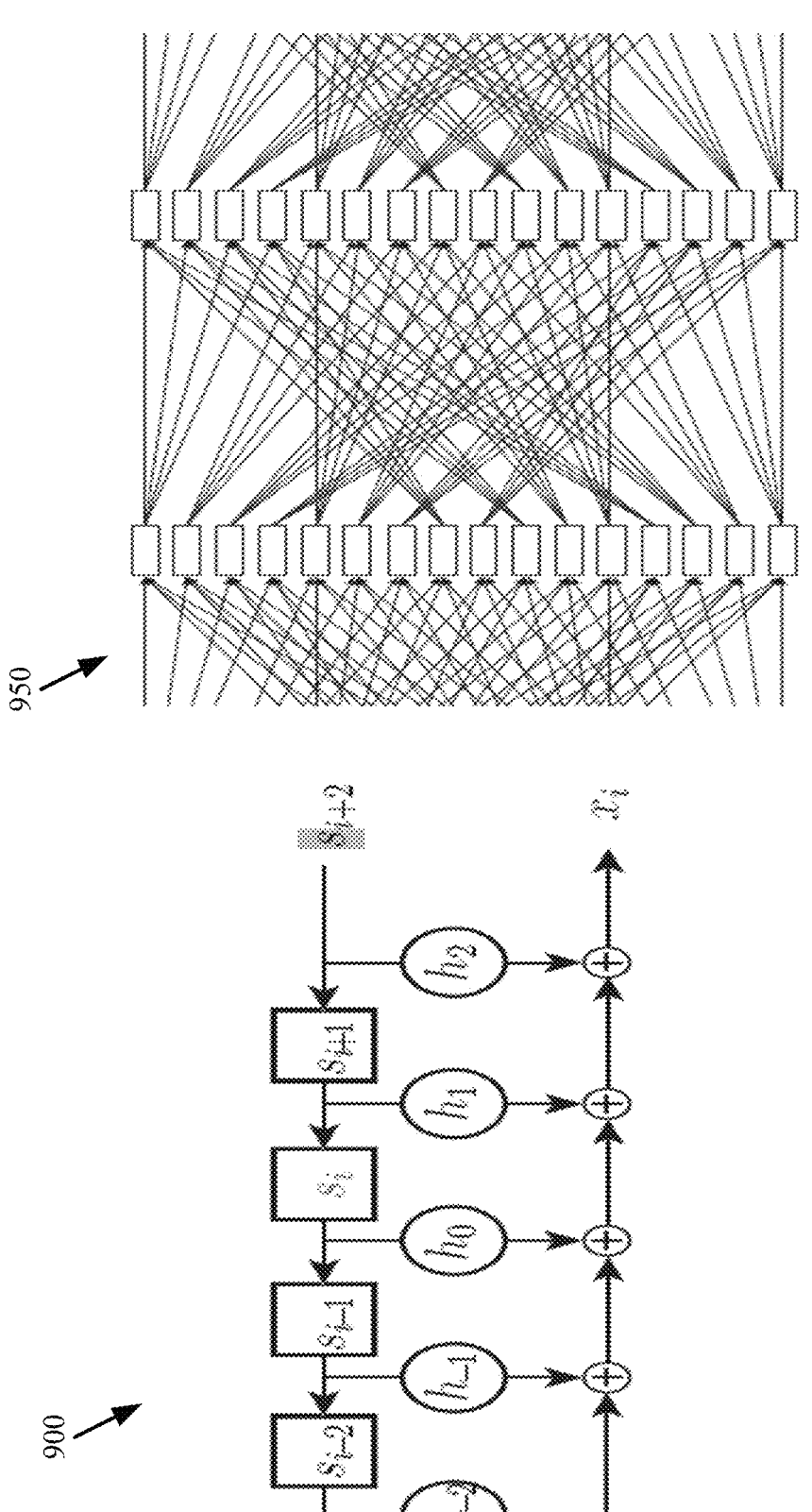
FIG. 9 provides an illustration of a discrete time model of the inter-symbol interference (ISI) effects resulting from frequency notch filtering (FNF), covering five relevant taps, along with an example trellis section that would act as a computational blueprint for the BCJR algorithm.

To illustrate, FIG. 9 provides an illustration of a discrete ISI process model 900 of the discrete ISI channel covering five relevant taps. An illustrative trellis section 950 is also shown for sixteen states. The trellis state is defined as the vector $[s_{i-2}, s_{i-1}, s_i, s_{i+1}]$. Since there are four possible values for each $s_i$, there are two hundred fifty-six possible states. The transitions between these states are illustrated in model 900 (again, for a reduced-sized trellis of 16 states for visibility). The values $h_{-2}$, $h_{-1}$, $h_0$, $h_1$, $h_2$ are the complex ISI taps 702. The output symbol $x_i$ is the discrete sampled output of the noise-free filtered SOI s(t), represented by its sequence $\{s_i\}$ of discrete QPSK symbols.

Given the sequence of input (QPSK) signals to the ISI channel, the trellis structure 950 allows for the computation of the ISI signal part $x_i$ of the received signal $y_i=x_i+n_i+\epsilon_i$ of the channel, up to an accuracy $\epsilon_i$, determined by the taps that are neglected in the model 900, and the noise contribution $n_i$. Since the channel is acausal (that is, there are pre-cursors and post-cursors with respect to the central signal), the trellis memory 618 needs to reach both into the past and future. As such, the current symbol $x_i$ is embedded into the center of the memory so that it activates the center tap $h_0$ at time i. This means that the trellis needs to store the future symbol $x_{i+1}$ and past symbols $x_{i-1}$, $x_{i-2}$ in order to generate $x_i$ for the case of 256 states. Obviously, this requires appropriate delay mechanisms to execute the algorithm in a strictly causal computing device.

After signal $x_i$ is generated by the model 900, the contents of the memory 618 are shifted to left, and a new symbol candidate $s_{i+3}$ enters the delay chain and signal $x_{i+1}$ is generated. This discrete delay model 900 (illustrated here for the specific case of 5 taps for a QPSK signal, leading to 256 states) is a representation of what the transmitted QPSK symbols experience in the actual notched channel, including sampling. Since the demodulator 514 has no knowledge of which symbol sequence $x=[s_0, s_1, \ldots, s_N]$ is actually transmitted, the BCJR algorithm follows all possible sequences. This is the purpose of the trellis structure 950. The trellis structure 950 is configured to keep track of the likelihood of each sequence at each time step. When paths merge in the trellis structure 950, two states that share the symbols $[s_{i-1}, s_i, s_{i+1}]$ have different values for $s_{i-2}$ progress to the same new state $[s_{i-1}, s_i, s_{i+1}, s_{i+2}]$. When this happens, they share all possible future path extensions, and therefore the probabilities of their past sequence portions can be combined. This is the significance of the merger.

The BCJR algorithm maintains two sets of variable arrays of size number of state×length of sequence. These are called $\alpha_r(i)$ and $\beta_r(i)$, where i refers to a time stamp or symbol index, and r refers to the state index (in the present example $r\in[1, 256]$). The BCJR algorithm progresses via a forward recursion, which computes future values of α as $$\alpha_r(i) = \sum_i \alpha_{r-1}\gamma_r(I \to i) \tag{5}$$

and a backward recursion, which computes past values of β as $$\beta_r(j) = \sum_k \beta_{r+1}(k)\gamma_{r+1}(j \to k) \tag{6}$$

and where the values $\gamma_r(1\to i)$ are metric values derived from the received signals y. The sums in the above equations (5), (6) range over all states that connect to i or j, respectively. The α and β can be interpreted as conditional probabilities that actual symbol sequence reaches $\alpha_r(i)$ from the past, or $\beta_r(j)$ from the future, i.e., $$\alpha_r(i) = Pr(\text{state at time } r) = i|[y_0, y_1, \ldots, y_r] \tag{7}$$

and $$\beta_r(j) = Pr(\text{state at time } r) = j|[y_{r+1}, y_{r+2}, \ldots, y_N] \tag{8}$$

Consequently, in a final step, the probability that the actual symbol sequence traversed a specific transition in the representative trellis can be shown to be $$Pr(1 \to k) \propto \alpha_r(1)\beta_r(k). \tag{9}$$

From transition probabilities, any other relevant probability may be computed (such as the probabilities of the symbols $s_i$) by adding all the transition probabilities $Pr(1\to k)$ which correspond to a given symbol s.

The soft symbol demodulator 604 uses the BCJR algorithm to generate a posteriori symbol probabilities from which the soft symbols are constructed. The soft symbols may be defined by the following mathematical equation (10).

$$\check{s}_i = \sum_{m=1}^{4} Pr(s_i = s_m) \tag{10}$$

The soft symbol demodulator 604 then performs operations to modulate the soft symbols onto a pulse waveform. The signal output from the soft symbol demodulator 604 is passed to the reconstruction filter 606, which fills in signal gap(s) that were introduced by the notch filter 614. FIG. 10 provides graphs showing that the BCJR-based filtering improves the bit error performance of an interference cancelation device.

FIG. 11 provides a flow diagram of an illustrative method 1100 for soft-demodulation-based waveform repair for signals undergoing spectral suppression. Method 1100 may be implemented in a receiver (e.g., receiver 500 of FIG. 5) of a communication device (e.g., communication device 302, 304, 306, 308, 312 of FIG. 3 and/or 400 of FIG. 4) and/or a computer system (e.g., computer system 1200 of FIG. 12). Some or all of the operations of method 1100 may be performed by an interference cancellation device (e.g., interference cancellation device 512 of FIG. 5) and/or demodulator (e.g., demodulator 514 of FIG. 5) of the receiver.

Method 1100 begins with 1102 and continues to 1104 where a channel of the communication device is monitored. The communication device receives a signal of interest (e.g., signal 1024 of FIG. 1) with interference (e.g., interference 104 of FIG. 1) in block 1106. The received signal is provided to the circuit (e.g., circuit 600 of FIG. 6) in block 1108. As such, the circuit receives the signal in block 1110.

The circuit then performs the operations of blocks 1112-1120. These operations involve: (1112) performing band-rejection filtering to remove the interference from the signal of interest; (1114) generating an a posteriori probability estimate for each symbol of a sequence of symbols in the signal of interest using an output signal of the band-rejection filtering; (1116) applying reconstruction filtering to the a posteriori probability estimates to demodulate a portion of the signal of interest which was removed by the band-rejection filtering; (1118) combining the band-rejection filtered portion of the signal of interest with the output signal of the reconstruction; and (1120) performing upconversion and bandpass filtering using a resulting signal from said combining to reconstitute the signal of interest without interference. Block 1118 may also involve delaying the output signal of the band-rejection filtering prior to combining it with the demodulated portion of the signal of interest.

In some scenarios, the band-rejection filtering comprises notch filtering. The notch filtering may be shaped to minimize a number of estimated channel taps (e.g., taps 704 of FIG. 7) needed to represent a given signal energy and maximize suppression of inter-symbol interference taps (e.g., taps 702 of FIG. 7). The a posteriori probability estimate for each symbol (e.g., symbol $s_i$ of FIG. 9) may be generated using at least one past symbol (e.g., symbol(s) $s_{i-1}$ and/or $s_{i-2}$ of FIG. 9) that comes before the symbol in the sequence of symbols and at least one future symbol (e.g., symbol(s) $s_{i+1}$ and/or $s_{i+2}$ of FIG. 9) that comes after the symbol in the sequence of symbols. The a posteriori probability estimates may be generated using a BCJR algorithm. The reconstruction filtering may comprise bandpass filtering.

Upon completing the operations of 1120, method 1100 continues to block 1122, where it ends or other operations are performed. The other operations can include, but are not limited to, returning to block 1102 or block 1110.

Figure 12:
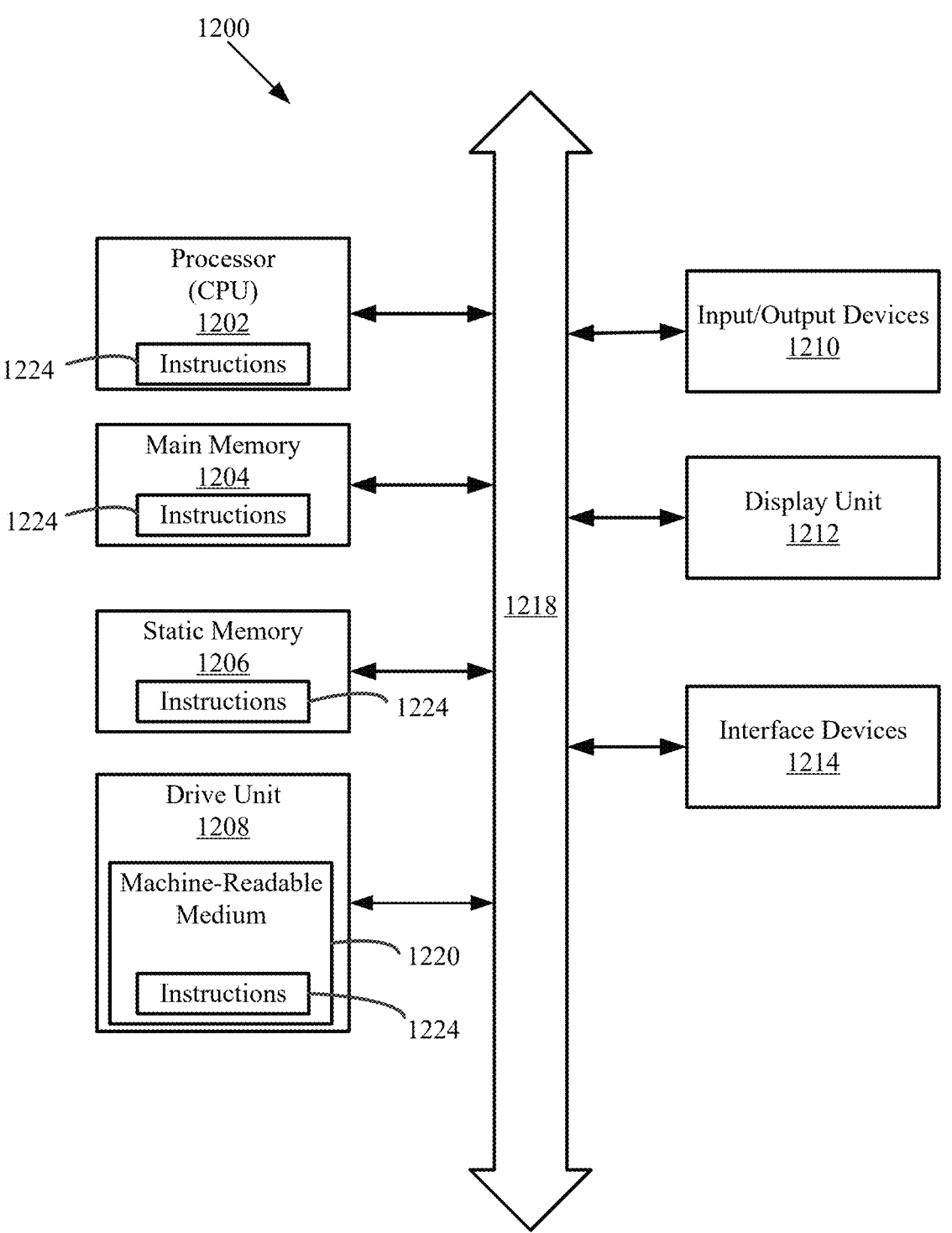
FIG. 12 provides an illustration of a computer system.

FIG. 12 provides an illustration of a hardware block diagram for a computer system 1200 that can be used for implementing all or part of the interference cancellation device 512 of FIG. 5, the demodulator 514 of FIG. 5, circuit 600 of FIG. 6, and/or method 1100 of FIG. 11. The machine can include a set of instructions which are used to cause the circuit/computer system to perform any one or more of the methodologies discussed herein. While only a single machine is illustrated in FIG. 12, it should be understood that in other scenarios the system can be taken to involve any collection of machines that individually or jointly execute one or more sets of instructions as described herein.

The computer system 1200 is comprised of a processor 1202 (e.g., a central processing unit (CPU)), a main memory 1204, a static memory 1206, a drive unit 1208 for mass data storage and comprised of machine-readable media 1220, input/output devices 1210, a display unit 1212 (e.g., a liquid crystal display (LCD) or a solid state display, and one or more interface devices 1214. Communications among these various components can be facilitated by means of a data bus 1218. One or more sets of instructions 1224 can be stored completely or partially in one or more of the main memory 1204, static memory 1206, and drive unit 1208. The instructions can also reside within the processor 1202 during execution thereof by the computer system. The input/output devices 1210 can include a keyboard, a multi-touch surface (e.g., a touchscreen), and so on. The interface device(s) 1214 can be comprised of hardware components and software or firmware to facilitate an interface to external circuitry. For example, in some scenarios, the interface devices 1214 can include one or more analog-to-digital (A/D) converters, digital-to-analog (D/A) converters, input voltage buffers, output voltage buffers, voltage drivers and/or comparators. These components are wired to allow the computer system to interpret signal inputs received from external circuitry and generate the necessary control signals for certain operations described herein.

The drive unit 1208 can comprise a machine-readable medium 1220 on which is stored one or more sets of instructions 1224 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, electrically erasable programmable read-only memory (EEPROM), and flash memory devices. A tangible medium as described herein is one that is non-transitory insofar as it does not involve a propagating signal.

Computer system 1200 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein.

Applications that can include the apparatus and systems broadly include a variety of electronic and computer systems. Thus, the exemplary system is applicable to software, firmware, and hardware implementations.

In view of the foregoing, the present document concerns implementing system and methods for waveform repair. The methods comprise: receiving a signal of interest having a neutral or intentional spectral distortion, the signal of interest having a sequence of symbols; generating an estimate for each symbol of a sequence of symbols in the signal of interest; and applying reconstruction filtering to the estimates to correct the spectral distortion.

The methods may also comprise: performing band-rejection filtering to remove the interference from the signal of interest. The estimate can include, but is not limited to, a maximum a posteriori probability estimate for each symbol of a sequence of symbols that is generated using an output signal of the band-rejection filtering. The estimated symbols may be used with a reconstruction filtering to rebuild the portion of the signal of interest which was removed by the band-rejection filtering. The methods may also comprise: combining the band-rejection filtered portion of the signal of interest with the output signal of the reconstruction; and performing upconversion and bandpass filtering using a resulting signal from said combining to reconstitute the signal of interest without interference.

The band-rejection filtering can include, but is not limited to, notch filtering. In this scenario, the methods may comprise shaping the notch filtering to minimize the energy of the inter-symbol interference. The estimate for each symbol may be generated using at least one past symbol that comes before the symbol in the sequence of symbols and at least one future symbol that comes after the symbol in the sequence of symbols. The estimate may be generated, for example, using a BCJR algorithm. The reconstruction filtering can include, but is not limited to, bandpass filtering.

The present document also concerns a circuit, comprising: an approximate soft symbol demodulator configured to generate an estimate for each symbol of a sequence of symbols in a received signal of interest having a spectral distortion; and a reconstruction filter configured to apply reconstruction filtering to the estimates to correct the spectral distortion.

The circuit may also comprise a frequency notching filter module configured to perform band-rejection filtering to remove the interference from the signal of interest. The estimate can include, but is not limited to, a maximum a posteriori probability estimate for each symbol of a sequence of symbols that is generated using an output signal of the band-rejection filtering. The estimated symbols may be used with a reconstruction filtering to rebuild the portion of the signal of interest which was removed by the band-rejection filtering.

The circuit may also comprise: a combiner configured to combine the band-rejection filtered portion of the signal of interest with the output signal of the reconstruction; and a filter configured to perform upconversion and bandpass filtering using an output signal of said combiner to reconstitute the signal of interest without interference.

The band-rejection filtering can include, but is not limited to, notch filtering. The notch filtering may be shaped to minimize a number of estimated channel taps needed to represent a given signal energy and maximize suppression of inter-symbol interference taps.

The present document further concerns a non-transitory computer-readable medium that stores instructions that, when executed by at least one computing device, will cause the at least one computing device to perform operations comprising: receiving a signal of interest having a spectral distortion, the signal of interest having a sequence of symbols; generating an estimate for each symbol of a sequence of symbols in the signal of interest; and applying reconstruction filtering to the estimates to correct the spectral distortion. The at least one computing device may also be caused to perform band-rejection filtering to remove the interference from the signal of interest. The estimate can include, but is not limited to, a maximum a posteriori probability estimate for each symbol of a sequence of symbols that is generated using an output signal of the band-rejection filtering.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A method for waveform repair, comprising:

receiving a signal of interest having a spectral distortion, the signal of interest having a sequence of symbols;

performing band-rejection filtering to remove interference from the signal of interest;

generating an estimate for each symbol of a sequence of symbols in the signal of interest; and applying reconstruction filtering to the estimates to correct the spectral distortion, wherein the reconstruction filtering is applied to the estimates to demodulate a portion of the signal of interest which was removed by the band-rejection filtering.

2. The method according to claim 1, wherein the estimate comprises a maximum a posteriori probability estimate, or an appropriate approximation thereof, for each symbol of a sequence of symbols that is generated using an output signal of the band-rejection filtering.

3. The method according to claim 1, further comprising:

combining the band-rejection filtered portion of the signal of interest with an output signal of the reconstruction filtering; and performing upconversion and bandpass filtering using a resulting signal from said combining to reconstitute the signal of interest without interference.

4. The method according to claim 1, wherein the band-rejection filtering comprises notch filtering.

5. The method according to claim 4, wherein the notch filtering is shaped to minimize the energy of intersymbol interference.

6. The method according to claim 1, wherein the estimate for each symbol is generated using at least one past symbol that comes before the symbol in the sequence of symbols or at least one future symbol that comes after the symbol in the sequence of symbols.

7. The method according to claim 1, wherein the estimate for each symbol is generated using a BCJR algorithm.

8. The method according to claim 1, wherein the reconstruction filtering comprises bandpass filtering.

9. A circuit, comprising:

a soft symbol demodulator configured to generate an estimate for each symbol of a sequence of symbols in a received signal of interest having a spectral distortion;

a frequency excision module configured to perform band-rejection filtering to remove interference from the signal of interest; and a reconstruction filter configured to apply reconstruction filtering to the estimates to correct the spectral distortion;

wherein the reconstruction filtering is applied to the estimates to demodulate a portion of the signal of interest which was removed by the band-rejection filtering.

10. The circuit according to claim 9, wherein the estimate comprises a maximum a posteriori probability estimate, or an appropriate approximation thereof, for each symbol of a sequence of symbols that is generated using an output signal of the band-rejection filtering.

11. The circuit according to claim 9, further comprising:

a combiner configured to combine the demodulated portion of the signal of interest with the output signal of the band-rejection filtering; and a filter configured to perform upconversion and bandpass filtering using an output signal of said combiner to reconstitute the signal of interest without interference.

12. The circuit according to claim 9, wherein the band-rejection filtering comprises notch filtering.

13. The circuit according to claim 12, wherein the notch filtering is shaped to minimize the energy of inter-symbol interference.

14. A non-transitory computer-readable medium that stores instructions that, when executed by at least one computing device, will cause the at least one computing device to perform operations comprising:

receiving a signal of interest having a spectral distortion, the signal of interest having a sequence of symbols;

performing band-rejection filtering to remove interference from the signal of interest;

generating an estimate for each symbol of a sequence of symbols in the signal of interest; and applying reconstruction filtering to the estimates to correct the spectral distortion, wherein the reconstruction filtering is applied to the estimates to demodulate a portion of the signal of interest which was removed by the band-rejection filtering.

15. The non-transitory computer-readable medium according to claim 14, wherein the estimate comprises a maximum a posteriori probability estimate, or an appropriate approximation thereof, for each symbol of a sequence of symbols that is generated using an output signal of the band-rejection filtering.

* * * * *